(12) United States Patent
Bandyopadhya et al.

(10) Patent No.: US 7,309,425 B2
(45) Date of Patent: Dec. 18, 2007

(54) APPARATUS FOR THE PREPARATION OF ARSENIC FREE WATER

(75) Inventors: Sibdas Bandyopadhya, West Bengal (IN); Dipali Kundu, West Bengal (IN); Somendra Nath Roy, West Bengal (IN); Bishnupada Ghosh, West Bengal (IN); Himadri Sekhar Maiti, West Bengal (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 11/203,264

(22) Filed: Aug. 15, 2005

(65) Prior Publication Data

US 2006/0021927 A1 Feb. 2, 2006

Related U.S. Application Data

(62) Division of application No. 10/109,053, filed on Mar. 29, 2002, now Pat. No. 7,014,771.

(51) Int. Cl.
*C02F 1/42* (2006.01)

(52) U.S. Cl. ............ 210/196; 210/263; 210/912; 210/688

(58) Field of Classification Search ............ 210/196, 210/263, 912, 688
See application file for complete search history.

(56) References Cited

U.S. PATENT DOCUMENTS

| 3,674,686 A | 7/1972 | Brimmer et al. |
| 4,786,527 A | 11/1988 | Fejes et al. |
| 5,227,053 A * | 7/1993 | Brym .................. 210/143 |
| 5,480,524 A * | 1/1996 | Oeste .................. 204/158.2 |
| 5,556,545 A | 9/1996 | Volchek et al. |
| 5,769,961 A | 6/1998 | Peters et al. |
| 6,491,822 B2 | 12/2002 | Alper |

* cited by examiner

*Primary Examiner*—Chester T. Barry
(74) *Attorney, Agent, or Firm*—Nixon & Vanderhye, P.C.

(57) ABSTRACT

The present invention relates to a process for the preparation of arsenic free water and an apparatus therefor. The present invention also relates to a porous ceramic useful for pressure filtration in order to produce arsenic free water. The present invention particularly relates to a process for preparing arsenic free (<10 ppb) water from arsenic contaminated ground water and apparatus therefor.

4 Claims, 1 Drawing Sheet

APPARATUS FOR THE PREPARATION OF ARSENIC FREE WATER

CROSS REFERENCE TO RELATED APPLICATION

Figure 1:
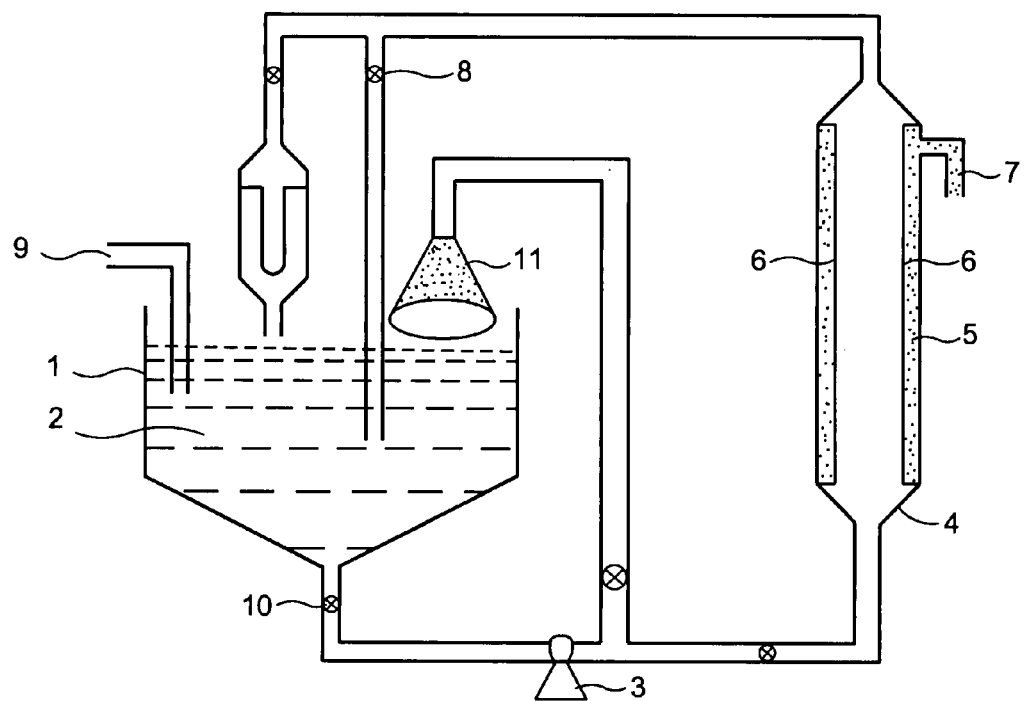

This application is a division of application Ser. No. 10/109,053, filed Mar. 29, 2002 now U.S. Pat. No. 7,014,771, the entire content of which is hereby incorporated by reference in this application.

FIELD OF THE INVENTION

The present invention relates to a process for the preparation of arsenic free water and an apparatus therefor. The present invention also relates to a porous ceramic useful for pressure filtration in order to produce arsenic free water. The present invention particularly relates to a process for preparing arsenic free (<10 ppb) water from arsenic contaminated ground water and an equipment therefor.

BACKGROUND OF THE INVENTION

Ground water drawn from intermediate aquifers of various parts of West Bengal and Bangladesh was found to contain arsenic above the permissible limit of 0.05 ppm. The WHO recommended limit being 0.01 ppm. Thus the water from tube wells and hand pumps is unsuitable for drinking purpose. Arsenic contamination of ground water therefore assumed a serious public health issue as ground water serves more than 80% of the drinking water needs primarily in the rural sector.

Various physical and chemical processes are known for removing arsenic from wastewater for recovery and/or as a pollution abatement measure. Separation can be achieved by arsenic adsorption on amorphous aluminum hydroxide. By such means, as discussed in the Journal of Colloids and Interface Science, volume 54, No. 3, pages 391-399, 1976, a plateau of 0.3 ppm arsenic can be attained but further reduction of arsenic content is difficult.

It is also known that by precipitation with calcium oxide and ferric chloride the arsenic concentration in waste water has been reduced from 1000 ppm to 5 ppm as described by J. Hollo et al in Polytech. Chem. Engg. (Budapest)12(3); page 283-292, 1968.

Japanese Patent 20952 (1974) described the use of both slaked lime and bleaching solution together with magnesium chloride for removal of Arsenic(III) from waste water wherein a waste water containing 2490 ppm Arsenic(III) was stirred with these reagents and upon filtering the precipitates, the filtrate had a arsenic content of 3.07 ppm.

The U.S. Pat. No. 4,201,667 (1987) describes a process for removing arsenic from aqueous mediums wherein sufficient calcium hydroxide is added in the presence of phosphorous to adjust the pH of the aqueous medium from about 7.0 to 11.5 whereby precipitates of both arsenic and phosphorous are formed and subsequently separated from the aqueous medium. In this process the stirring time was reported to about 30 minutes and separation of the precipitate may be achieved by filtration, settling and decanting, and settling followed by filtration of the supernatant. The arsenic content in the treated water was above 0.01 ppm using this technique.

References is also made to publications by Prasun Bhattacharyya et al and S. Bhattacharyya et al in the Proceedings of International workshop on "Control of arsenic contamination in ground water" held on Jan. 5-6, 2000 published by PHED, Govt. of West Bengal, wherein laterite was used as an adsorbent for treatment of arsenic contaminated water. In the above noted proceedings, Prasun Bhattacharyya et al reported that the efficiency varied between 50-90% for 5 gm of added laterite per 100 ml water under an equilibration period of 20 minutes and S. Bhattacharyya et al reported that 0.2 gm laterite ore can absorb 67.4% and 61.3% arsenic from 100 ml of 0.27 ppm As(III) or 0.182 ppm of As(V) solution and a shaking time of 5 minutes is found to be optimum for 0.4 gm laterite ore and 100 ml solution of aforesaid concentrations of Arsenic (III or V).

References is also made to the publication of Environmental Systems Information Center, Asian Institute of Technology, March, 1996 on "Drinking water without arsenic: a review of treatment technology", by T. Viraraghavan. K. S. Subramanian and T. V. Swaminathan wherein the advantages and disadvantages of various technology options were described. The conventional techniques for treatment of arsenic contaminated water are primarily based on chemical treatment or co-precipitation technique and adsorption technique which have been tested under field conditions using ground water containing arsenic in the range of 0.1-1 ppm level and arsenic level in the treated water was found to be above WHO recommended limit of 0.01 ppm of arsenic content in drinking water. The co-precipitation technique suffers from the disadvantages like controlling the dose of chemicals, ineffective mixing of chemicals and contaminated water, slower settling rate of the fine particles of precipitating materials, inefficient filtration of fine particles by slow or rapid sand filter due to which the efficiency of arsenic removal is lower particularly in the higher concentration range of arsenic [above 0.5 ppm] in the contaminated water and the arsenic content after treatment is higher than the WHO recommended limit of 0.01 ppm of arsenic in drinking water. The drawbacks of the activated alumina adsorption technique are insufficient contact time, coating of alumina grains by fine particles of iron present in raw water thereby reducing the efficiency of adsorption and necessity of frequent back washing, shifting the problem of water pollution to soil contamination which is of more serious concern to environmental pollution particularly in the vicinity of treatment plant.

Existing arsenic removal methods and equipments revealed that there is a definite need for improvement in producing safe drinking water as per recommendation of WHO.

It is known to use porous ceramics for separation of suspended particulate matter present in liquid and gaseous streams by passing the same through the porous ceramic tubes and plates for pressure filtration application. Another important use of such porous ceramic material are for preparation of ceramic membranes consisting of a coating of finer particles over the porous ceramic matrix to form a composite structure of graded pore size which are primarily used for micro, ultra and nano filtration application.

Reference may be made to U.S. Pat. No. 126,508 wherein the raw materials used for the preparation of porous ceramic candles were coarser and angular grains of silica and a naturally occurring clay having much impurities causing wide pore size distribution, poor strength and formation of glassy matrix unsuitable for cleaning by strong alkalis and high pressure steam. The drawback of conventional porous ceramic candle filters are 1. Larger pore size varying in the range of 5-30 μm.
2. Owing to such broad pore size distribution, the efficiency of separation is much less and the chances of the pores clogging are very high due to penetration of the finer suspended particulates posing problems of frequent cleaning.
3. The suspended particles of relatively lower sizes passes through higher pore size of the porous candle when the filtration takes place under atmospheric pressure.

To overcome this problem, cartridges of polymeric materials have been developed which has an integral skin of finer pore sizes as described in the reference Porter, M. C., 1990, Handbook of Industrial Membrane Technology, Noyes Publication, Park Ridge, N.J. However, such materials also suffer from limitations of
1) poor chemical stability
2) low abrasiveness
3) low durability towards microbial attack, Ceramic materials have several key performance advantages over their polymeric counterpart due to which porous ceramics are gaining considerable importance and industrial applications. Reference may be made to the paper "The control of pore size in the manufacture of ceramic filters", R. A. Clark, M. F. Hall and J. W. Kirk, in the British Ceramic Proceeding, No. 43, December 1988, Institute of Ceramics, U.K. wherein the technique adopted for the manufacture of ceramic filters utilizes differently sized irregularly shaped non-plastic alumina particles following the theories of particle packing of different grain size range to control porosity and pore size in the filter. The drawbacks of this process are use of costly raw materials, difficulties in fabrication of the non-plastic component by slip casting, use of costly equipment like extruder and necessity of firing at high temperature above 1550° C. resulting in higher cost of filters.

OBJECTS OF THE INVENTION

The main object of the invention is to provide a process for making porous ceramics for pressure filtration, which obviates above noted drawbacks.

Another object of the invention is to provide porous ceramics having controlled pore size in the range of 1-15 μm.

Yet another object of the invention is to provide a process for reducing the cost of production by using relatively cheaper raw materials easier fabrication technique and lower firing temperature.

It is another object of the invention is to provide a process for preparing arsenic free (<10 ppb) water from contaminated ground water which obviates the drawbacks of the hitherto known processes.

Another object of the invention is to provide apparatus for producing arsenic free (<10 ppb) water from contaminated ground water.

Still another object of the invention is to provide apparatus for disposal of arsenic enriched sludge generated after treatment of contaminated water.

Yet another object of the invention is to provide apparatus wherein provision for periodical cleaning of ceramic filters is incorporated to enable regeneration and reuse.

SUMMARY OF THE INVENTION

Accordingly the present invention provides a process for preparing arsenic free (<10 ppb) water from arsenic contaminated water, which comprises mixing arsenic contaminated water with a homogeneous suspension in aqueous medium essentially containing fine particles of size below 20 μm of arsenic adsorbing media, circulating the resultant mixture under pressure in the range of 0.1 to 3 Kg/cm$^2$ through one or more porous ceramic pressure filtration tubes of pore size in the range 1 to 10 μm having a precoating of thickness of at least 10 μm of the said arsenic adsorbing media.

In one embodiment of the invention, the concentration of the arsenic adsorbing media is less than 5000 ppm.

In an embodiment of the invention the arsenic adsorbing media used for making the suspension is selected from the group consisting of hydroxides, oxy-hydroxides and phosphates of any of iron, aluminum, manganese, calcium and magnesium, hydrogen phosphate and ammonium phosphate.

In another embodiment of the invention, the arsenic contaminated water is arsenic contaminated around water.

The present invention also relates to an apparatus for the production of arsenic free water (<10 ppb) from arsenic contaminated water said apparatus comprising a mixing tank (1) essentially containing a suspension of arsenic adsorbing media, (2), the said tank having an inlet (9) for the arsenic contaminated ground water to be treated, and an outlet (10) for discharge, the said outlet (10) being connected through a pump (3) to a feed back spray (11) to the mixing tank (1) and one or more pressure filtration modules (4), each of the said modules (4) housing one or more ceramic pressure filtration tubes (5) encased in such a manner so as to allow discharge of the filtered water through an outlet (7), the said pressure filtration module being also provided with a feed back connection (8) to the said mixing tank (1).

In one embodiment of the invention, the outlet (10) is a valve between the mixing tank and the pump.

In an embodiment of the invention, the porous ceramic pressure filtration tubes is of pore size in the range of 1 to 10 μm having a precoating (6) of thickness at least 10 μm of the arsenic adsorbing media (2).

In still another embodiment of the present invention, a porous candle filter is provided for entrapping saturated arsenic enriched sludge.

In another embodiment of the invention, the process for the preparation of the arsenic free water comprises the steps of
1) taking a suspension of fine particles in water;
2) housing a plurality of arsenic media precoated porous ceramic tubes in a steel tube fitted with inlet and outlet pipes to form a filter module,
3) adding arsenic contaminated water was added to the aqueous suspension of fine particles and the mix was pumped through the filter module under a pressure of 0.1-3 Kg/cm$^2$ using cross flow filtration technique to produce filtered water.

The present invention also relates to a process for making porous ceramics for pressure filtration which comprises mixing 40 to 90 wt % non-plastic powder material selected from the group consisting of metal oxides, metal hydroxides, metal silicates and any mixture thereof; 10 to 60 wt % plastic powder material comprising naturally occurring aluminosilicates containing impurities selected from the group consisting of soda, potash, calcium oxide and iron-oxide less than 2.5 wt %; 0 to 15 wt % pore forming agents; 0 to 2% additives such as magnesia, titania, zinc oxide; deionised water; adding deflocculants and binders in the concentration range of 0.5 to 2.0% w/v of water, aging if required to obtain a casting slip, casting to shape, storing the shaped cast under humid condition for a period of 12 to 48 hours, air drying for a period of 12 to 48 hours, oven drying at a temperature in the range of 40 to 150° C. for a period of 12 to 24 hours, subjecting the dried cast to heating at the rate of 60 to 150° C. per hour to a temperature in the range 800 to 1000° C. for 1 to 6 hours followed by heating at a temperature in the range of 1300 to 1500° C. for 1 to 6 hours, cooling the resultant cast to room temperature at the rate of 60 to 150° C. per hour.

In an embodiment of the invention the metal oxide, hydroxide, silicates used is selected from the group consisting of alumina, boehmite, zirconia, yttria stabilized zirconia, mullite, calcined kyanite, sillimanite, diaspore and beach sand of rounded and sub-rounded grains in the size range of 1 to 75 μm having a maximum amount of impurities like alkali oxide and iron oxide up to 0.5 wt %.

In another embodiment of the invention, the aluminosilicate materials used are selected from the group consisting of kaolinite, montmorillonite and illite, containing less than 2.5 wt % of impurities such as soda, potash, calcium oxide, iron oxide.

In still another embodiment of the invention, the deflocculants and binders used are selected from the group consisting of polyvinyl alcohol, Darvan-7, sodium salt of carboxy methyl cellulose, sodium alginate, salts of polyacrylic acid and partially hydrolysed polyacrylic amide.

In still another embodiment of the invention, the ratio of average grain size of plastic and non-plastic components used is in the range of 0.04 to 0.53 to produce the pore size in the range 1 to 15 μm.

In yet another embodiment of the invention the proportion of the plastic and non-plastic ingredients used may be in the ratio of 0.11 to 1.5 in such a way that there are at least 10 to 30 wt % of finer particles of less than 1.0 μm size present in the mix.

In still another embodiment of the invention the pore forming agents used comprise 0 to 15 wt % combustible materials with not more than 5 wt % ash content such as flour. saw dust, carbon, charcoal, polymeric materials of particle size below 20 μm.

In still another embodiment of the present invention the mixing is effected in a plastic bottle or alumina lined pot for a period of 4 to 24 hours to form a slurry of viscosity in the range of 100-1000 cP.

BRIEF DESCRIPTION OF THE ACCOMPANYING DRAWING

FIG. 1. is a schematic representation of the apparatus of the invention.

DETAILED DESCRIPTION OF THE INVENTION

The process steps of the present invention are described below:
1) Preparation of slurry in water of the non plastic components like oxide, hydroxides silicates of metals, a combination of additives, plastic components like aluminosilicates, pore formers as combustible materials, binders and deflocculants.
2) Casting in the required shapes such as plates of 100 mm length or diameter and about 2 mm thick, tubes of about 1.5 to 4.0 mm wall thickness, 9 to 37 us pores following the burnout of organic fillers causes a problem. Sometimes bloating, pin-holes, surface waviness also occurs due to excessive emission of gasses through weaker zones during firing and also quick drainage of the slip, defective plaster moulds and such other reasons. Presence of fusible impurities causes excessive glass formation thereby disturbing the porous nature of the matrix. The critical features of the present invention is to utilize the theory of packing using narrow sized grains of non-plastic component and filling-up the inter-granular space of the particles without compromising the decrease in porosity and strength. The other parameters include homogenous mixing, control of impurity level and sintering temperature.

In the process of the present invention pore forming agents such as flour, saw dust, carbon, charcoal are used in the range of 1-15 wt % which creates voids in the matrix after firing at a temperature in the range of 1300°-1500° C. In the present invention it is necessary to control the ratio of plastic and non-plastic components in the range of 0.11 to 15 and to control the ratio of the average grain size to 0.04 to 0.53 to produce the aforesaid pore size in the range of 1-15 μm according to desired requirements.

The porous ceramics are made by mixing 40 to 90 wt % non-plastic powder material such as metal oxides, metal hydroxides and metal silicates or any mixture thereof; 10 to 60 wt % of plastic material powder such as naturally occurring aluminosilicates containing impurities like soda, potash, calcium oxide and iron-oxide less than 2.5 wt %; 0 to 15 wt % pore forming agents; 0 to 2% additives such as magnesia, titania, zinc oxide deionised water; adding deflocculants and binders in the concentration range of 0.5 to 2.0% w/v of water, aging if required to obtain a casting slip, casting to shape, storing the shaped cast under humid condition for a period of 12 to 48 hours, air drying for a period of 12 to 48 hours, oven drying at a temperature in the range of 40 to 150° C. for a period of 12 to 24 hours, subjecting the dried cast to heating at the rate of 60 to 150° C. at a temperature in the range 800 to 1000° C. for 1 to 6 hours followed by heating at a temperature in the range of 1300 to 1500° C. for 1 to 6 hours, cooling the resultant cast to room temperature at the rate of 60 to 150° C. per hour.

The metal oxide, hydroxide, silicates used may be such as, alumina, boehmite, zirconia, yttria stabilized zirconia, mullite, calcined kyanite, sillimanite, diaspore, beach sand of rounded and sub-rounded grains in the size range of 1 to 75 μm having a maximum amount of impurities like alkali oxide and iron oxide up to 0.5 wt %. The aluminosilicate materials used may be such as kaolinite, montmorillonite, illite containing impurities like soda, potash, calcium oxide, iron oxide less than 2.5 wt %. The deflocculants and binders used may be such as polyvinyl alcohol, Darvan-7, sodium salt of carboxy methyl cellulose, sodium alginate, salts of polyacrylic acid, partially hydrolysed polyacrylic amide.

The ratio of average grain size of plastic and non-plastic components used may be in the range of 0.04 to 0.53 to produce the pore size in the range 1 to 15 μm. The proportion of the plastic and non-plastic ingredients used may be in the ratio of 0.11 to 1.5 in such a way that there are at least 10 to 30 wt % of finer particles of less than 1.0 μm size present in the mix. The pore forming agents used may be 0 to 15 wt % combustible materials with not more than 5 wt % ash content such as flour, saw dust, carbon, charcoal, polymeric materials of particle size below 20 μm.

Mixing is preferably effected in a plastic bottle or alumina lined pot for a period of 4 to 24 hours to form a slurry of viscosity in the range of 100-1000 cP.

The process steps of the present invention are described below:
(a) Preparation of slurry in water of the non plastic components like oxide, hydroxides, silicates of metals, a combination of additives, plastic components like aluminosilicates, pore formers as combustible materials, binders and deflocculants.
(b) Casting in the required shapes such as plates of 100 mm length or diameter and about 2 mm thick, tubes of about 1.5 to 4.0 mm wall thickness, 9 to 37 us pores following the burnout of organic fillers causes a problem. Sometimes bloating, pin-holes, surface waviness also occurs due to excessive emission of gasses through weaker zones during firing and also quick drainage of the slip, defective plaster moulds and such other reasons. Presence of fusible impurities causes excessive glass formation thereby disturbing the porous nature of the matrix. The critical features of the present invention is to utilize the theory of packing using narrow sized grains of non-plastic component and filling-up the inter-granular space of the particles without compromising the decrease in porosity and strength. The other parameters include homogenous mixing, control of impurity level and sintering temperature.

The porous ceramics are shaped as required for pressure filtration having controlled pore sizes in the range of 1 to 15 μm. Another novelty is that the process is economical as it involves use of cheaper raw materials and firing at lower temperature.

The above novel features have been achieved as a direct result of the following steps
1. Use of non-plastic component of rounded or sub-rounded grains, controlled grain size and tower purity.
2. Use of higher amounts of plastic component
3. Controlling the rheological properties of the slip made by mixing the components with water addition and adjusting the dose of deflocculants and binders
4. Firing the shape at lower temperature in the range of 1300° to 1500° C.

The equipment of the present invention may be cleaned as follows:
1) When the fine particles are not able to adsorb arsenic species any more the suspension was pumped through candle filters housed separately under normal atmospheric pressure to entrap the arsenic enriched particles for disposal after cementation within hollow blocks.
2) When the dynamic coating of the fine particles over the inner wall of the porous ceramic tubes are also exhausted the tubes may be allowed to dry out for about a week for detachment of the dried layer due to formation of mud cracks and flushed with clean water prior to application of a fresh coating layer.
3) When the porous ceramic tubes due to prolonged usage are blocked it may be necessary to rinse with 0.1 to 5 N solution of hydrochloric acid and sodium hydroxide followed by washing with clean water.

The process and equipment of the present invention successfully removes arsenic to a level below 10 ppb from arsenic contaminated ground water to make safe drinking water. The novelty of the invention in achieving below 10 ppb level of arsenic is much better than the prescribed BIS limit of 50 ppb arsenic and better than WHO recommended limit of 10 ppb arsenic in drinking water. The process of removal of arsenic is achieved by the following inventive steps:
1) Treating arsenic contaminated ground water by mixing with an homogenous suspension of arsenic adsorbing media.
2) Circulating under pressure the mix of contaminated water and arsenic adsorbing media suspension through porous ceramic pressure filtration tubes which are precoated with the arsenic adsorbing media.

The following examples are given by way of illustration and therefore should not be construed to limit the scope of the present invention.

EXAMPLE 1

A mixing tank of 10 liter capacity was taken. 600 ml of 1200 ppm suspension of ferric hydroxide of less than 20 μm size in ground water was prepared. The suspension was added to the mixing tank having an outlet connected with a pump of ¼ HP capacity with the discharge rate of 30 liter per minute. The discharge end of the pump was connected with a porous ceramic pressure filtration tube of 10 mm outer diameter and 300 mm length. The other end of the ceramic tube was connected with stainless steel tube through a pressure gauge and a valve which was connected with the mixing tank. The pressure filtration tube was encased with a leak proof transparent plastic tube in such a manner that there is no leakage at the junction points and the filtered water was obtained through the outer surface of the pressure filtration tube. The suspension of ferric hydroxide is passed through the tube for about one hour to form a coating of more then 10 μm thickness of ferric hydroxide in the inner wall of the tube. 1200 ml of 7.5 ppm arsenic solution in the form of sodium arsenate was added to the ferric hydroxide suspension to maintain 5 ppm arsenic and 400 ppm of ferric hydroxide in the slurry. The slurry was pumped through a pressure filtration tube at a pressure of 2 $Kg/cm^2$ and the filtered water was collected. The arsenic content of the filtered water was determined by atomic absorption spectrometry and it was found to be below its detection limit (<2 ppb). The filtration rate was found to be about 500 lit/sq·m·/hr.

EXAMPLE 2

A mixing tank of 10 liter capacity was taken. 200 ml of 720 ppm suspension of aluminum hydroxide of less than 15 μm size in ground water was prepared. The suspension was added to the mixing tank having an outlet connected with a pump of ¼ HP capacity with the discharge rate of 30 liter per minute. The discharge end of the pump was connected with a porous ceramic pressure filtration tube of 10 mm outer diameter and 300 mm length. The other end of the ceramic tube was connected with stainless steel tube through a pressure gauge and a valve which was connected with the mixing tank. The pressure filtration tube was encased within a leak proof transparent plastic tube in such a manner that there is no leakage at the junction points and the filtered water was obtained through the outer surface of the pressure filtration tube. The suspension of aluminum hydroxide is passed through the tube for about one hour to form a coating of more then 10 μm thickness of aluminum hydroxide layer in the inner wall of the ceramic tube 1300 ml of 7 ppm arsenic solution in the form of sodium arsenate was added to the aluminum hydroxide suspension to maintain 5 ppm arsenic and 200 ppm of aluminum hydroxide in the slurry. The slurry was pumped through a pressure filtration tube at a pressure of 1.5 $Kg/cm^2$ and the filtered water was collected. The arsenic content of the filtered water was determined by atomic absorption spectrometry and it was found to be below its detection limit (<2 ppb). The filtration rate was found to be about 300 lit/sq·m·/hr.

EXAMPLE 3

A mixing tank of 10 liter capacity was taken. 400 ml of suspension in ground water containing 200 ml of 2700 ppm ferric hydroxide of less than 20 μm and 200 ml of 2700 ppm aluminum hydroxide of less than 15 μm size was prepared. The suspension was added to the mixing tank having an outlet connected with a pump of ¼ HP capacity with the discharge rate of 30 liter per minute. The discharge end of the pump was connected with a porous ceramic pressure filtration tube of 10 mm outer diameter and 300 mm length. The other end of the ceramic tube was connected with stainless steel tube through a pressure gauge and a valve which was connected with the mixing tank. The pressure filtration tube was encased within a leak proof transparent plastic tube in such a manner that there is no leakage at the junction points and the filtered water was obtained through the outer surface of the pressure filtration tube. The suspension of ferric hydroxide and aluminum hydroxide is passed through the tube for about one hour to form a coating of more then 10 µm thickness of layer containing ferric hydroxide and aluminum hydroxide in the inner wall of the ceramic tube. 1400 ml of 6.5 ppm arsenic solution in the form of sodium arsenate was added to the suspension of ferric hydroxide and aluminum hydroxide to maintain 5 ppm arsenic and 300 ppm of each of ferric hydroxide and aluminum hydroxide in the slurry. The slurry was pumped through a pressure filtration tube at a pressure of 2 $Kg/cm^2$ and the filtered water was collected. The arsenic content of the filtered water was determined by atomic absorption spectrometry and it was found to be below its detection limit (<2 ppb). The filtration rate was found to be about 500 lit/sq. m./hr.

EXAMPLE 4

A mixing tank of 50 liter capacity was taken. 4 liter of 900 ppm suspension of ferric hydroxide of <5 µm size in ground water was prepared. The suspension was added to the mixing tank having an outlet connected with a pump of ½ HP capacity with the discharge rate of 45 liter per minute. The discharge end of the pump was connected with a porous ceramic pressure filtration tube of 25 mm inner diameter and 200 mm length. The other end of the ceramic tube was connected with stainless steel tube through a pressure gauge and a valve which was connected with the mixing tank. The pressure filtration tube was encased within a leak proof transparent plastic tube in such a manner that there is no leakage at the junction points and the filtered water was obtained through the outer surface of the pressure filtration tube. The suspension of ferric hydroxide is passed through the tube for about 10 mins to form a coating of more then 10 µm thickness of ferric hydroxide layer in the inner wall of the ceramic tube. 14 liters of 1.0 ppm arsenic solution in the form of sodium arsenate was added to the ferric hydroxide suspension to maintain 0.8 ppm arsenic and 200 ppm ferric hydroxide in the slurry. The slurry was pumped through a pressure filtration tube at a pressure of 1 $Kg/cm^2$ and the filtered water was collected. The arsenic content of the filtered water was determined by atomic absorption spectrometry and it was found to be below 10 ppb. The filtration rate was found to be about 3.75 liter per hour.

EXAMPLE 5

A mixing tank of 1000 liter capacity was taken. 300 liter of 4000 ppm suspension of ferric hydroxide of <10 µm size in ground water was prepared. The suspension was added to the mixing tank having an outlet connected with a pump of 2 HP capacity with the discharge rate of 60 liter per minute. The discharge end of the pump was connected with a feed back tube to the mixing tans fitted with stainless steel nozzles to form a spray. The discharge end of the pump was also connected with a filter module consisting of seven nos. of porous ceramic pressure filtration tube of 34 mm outer diameter and 1000 mm length. The other end of the seven element ceramic filter module was connected to the mixing tank and a porous candle filter for entrapment of arsenic enriched sludge. The pressure filtration tubes were encased within a leak proof stainless steel casing in such a manner that there is no leakage at the junction points and the filtered water was obtained through the outer surface of the pressure filtration tube. The suspension of ferric hydroxide is passed through the tube for about 30 mins to form a coating of more then 10 µm thickness of ferric hydroxide layer in the inner wall of the ceramic tube. 700 liter of 0.8 ppm arsenic solution in the form of sodium arsenate and arsenite was added to the ferric hydroxide suspension to maintain 0.7 ppm arsenic and 1500 ppm of ferric hydroxide in the slurry. The slurry was pumped through a pressure filtration tube at a pressure of 1 $Kg/cm^2$ and the filtered water was collected. The arsenic content of the filtered water was determined by atomic absorption spectrometry and it was found to be below 10 ppb. The filtration rate was found to be about 1.5 liter per min. After running the equipment for about three months the suspension was passed through the porous candle filter to entrap the saturated arsenic enriched sludge. The filter module containing ceramic pressure filtration tubes was allowed to air dry and coating layer was washed with deionised water to clean the ceramic tubes and make it ready for reuse.

EXAMPLE 6

About 60 gm of alumina powder of average particle size 9.6 µm and 99.5% purity was taken. 140 gm of washed china clay containing 1.2 wt % of iron oxide, soda, potash and calcium oxide impurities was added with the alumina. 30 gm of carbon powder containing 3.6 wt % ash was added to the aforesaid mix. The powder mix was charged in a plastic bottle with 400 gm alumina ball and 300 cc of deionised water. The materials were mixed for 6 hours and the slurry was unloaded in a flat container. 3 cc of 5% w/v Darvan-7 was added to the slurry to form a slip of viscosity 300 cP. The slip was poured in a two piece plaster of paris mould of about 16 mm internal diameter, the upper level of the slurry was maintained at a constant level by gradual addition of the slip time to time. The slip was allowed to remain within the mould for 2 minutes to maintain about 2 mm thickness of the cast after which the excess slurry was drained off. The cast body was allowed to remain within the mould for about 1 hour after which the two halves of the mould were separated out and the green cast was allowed to dry under humid condition for 2 days. The green tubes were slowly dried in air oven at 120-130° C. for 24 hours. The average bulk density of green tubes was maintained in the range of 1.4-1.5 gm/cc. The green tubes were heated at the rate of 100° C. per hour maintained at 800° C. for 1 hour, then at 1500° C. for 4 hours and cooled to room temperature at the rate of 100° C. per hour. The apparent porosity of fired samples was found to be 44% with average pore size of 4.15 µm and fired MOR of about 30 MPa. The clean water permeability of the tubular samples was of the order of 12,000 LMH.bar.

EXAMPLE 7

About 80 gm of alumina powder (99.5% purity) of average particle size 2.5 µm was mixed with 120 gm of processed and purified plastic clay containing less than 2.5 wt % total impurities (iron oxide, soda, potash and calcium oxide) and 30 grams of carbon powder containing 3.6% ash.

The powder mix was then charged in a plastic bottle with 400 gm alumina ball and 330 cc of deionised water. The materials were mixed for 3.5 hours and the slurry was unloaded in a flat container. 3 cc of 5% w/v Darvan-7 was added to the slurry to form a slip of viscosity 250 cP. The slip was poured in a two piece plaster of paris mould of about 16 mm internal diameter, the upper level of the slurry was maintained at a constant level by gradual addition of the slip time to time. The slip was allowed to remain within the mould for 1.5 minutes to maintain about 2 mm thickness of the cast after which the excess slurry was drained off. The cast body was allowed to remain within the mould for about 1 hour after which the two halves of the mould were separated out and the green cast was allowed to dry under humid condition for 18 hours. The green cast tubes slowly dried in air oven at 120-130° C. for 24 hours. The average bulk density of green tubes was maintained in the range of 1.35-1.4 gm/cc. The green tubes were heated at the rate of 100° C. per hour maintained at 800° C. for 1 hour, then at 1500° C. for 4 hours and cooled to room temperature at the rate of 100° C. per hour. The apparent porosity of fired samples was found to be 52% with average pore size of 2.8 μm and fired MOR of about 26.48 MPa. The clean water permeability of the tubular samples was of the order of 6106 LMH bar.

EXAMPLE 8

400 gm of alumina powder (91.5% purity) of average particle size 37 μm was mixed with 600 gm of processed and purified china clay containing 1.2 wt % iron oxide, soda, potash and calcium oxide as impurities. The powder mix was then charged in a plastic bottle with 1000 gm alumina ball and 1300 cc of deionised water. The materials were mixed for 3 hours and the slurry was unloaded in a flat container. 7 cc of 5% w/v Darvan-7 was added to the slurry to form a slip of viscosity 360 cP. The slip was poured in a two piece plaster of paris mould of about 16 mm internal diameter, the upper level of the slurry was maintained at a constant level by gradual addition of the slip time to time. The slip was allowed to remain within the mould for 1 minute to maintain about 2 mm thickness of the cast after which the excess slurry was drained off. The cast body was allowed to remain within the mould for about 1 hour after which the two halves of the mould were separated out and the green cast was allowed to dry under humid condition for 18 hours. The green cast tubes slowly dried in air oven at 120-130° C. for 24 hours. The average bulk density of green tubes was maintained in the range of 1.6-1.7 gm/cc. The green tubes were heated at the rate of 100° C. per hour maintained at 800° C. for 1 hour, then at 1500° C. for 4 hours and cooled to room temperature at the rate of 100° C. per hour. The apparent porosity of fired samples was found to be 55% with average pore size 5 μm. The clean water permeability of the tubular samples was of the order of 20,000 LMH·bar

EXAMPLE 9

About 80 gm of alumina powder of average particle size 2.5 μm and 99.5% purity was taken. 120 gm of washed bikaner clay containing 2 wt % of iron oxide, soda, potash and calcium oxide impurities was added with the alumina. 30 gm of carbon powder containing 3.4 wt % ash was added to the aforesaid mix. The powder mix was charged in a plastic bottle with 400 gm alumina ball and 300 cc of deionised water. The materials were mixed for 6 hours and the slurry was unloaded in a container. 4 cc of 5% w/v Darvan-7 was added to the slurry to form a slip of viscosity 230 cP. The slip was poured in a two piece plaster of paris mould of about 16 mm internal diameter, the upper level of the slurry was maintained at a constant level by gradual addition of the slip time to time. The slip was allowed to remain within the mould for 2.5 minutes to maintain about 2.5 mm thickness of the cast after which the excess slurry was drained off. The cast body was allowed to remain within the mould for about 1 hour after which the two halves of the mould were separated out and the green cast was allowed to dry under humid condition for 2 days. The green tubes were slowly dried in air oven at 120-130° C. for 24 hours. The average bulk density of green tubes was maintained in the range of 1.4-1.5 gm/cc. The green tubes were heated at the rate of 100° C. per hour maintained at 800° C. for 1 hour, then at 1500° C. for 4 hours and cooled to room temperature at the rate of 100° C. per hour. The apparent porosity of fired samples was found to be 34% with average pore size of 4.04 μm and fired MOR of about 28 MPa. The clean water permeability of the tubular samples was of the order of 9160 LMH.bar.

EXAMPLE 10

900 gm of alumina powder (99.5% purity) of average particle size 2.5 μm was mixed with 100 gm of processed china clay containing less than 2.5 wt % total impurities (iron oxide, soda, potash and calcium oxide) and 100 grams of carbon powder containing 3.6% ash. The powder mix was then charged in a plastic bottle with 1000 gm alumina ball and 1500 cc of deionised water. The materials were mixed for 5 hours and the slurry was unloaded in a flat container. 8 cc of 5% w/v Darvan-7 and 5 cc of 2% w/v polyvinyl alcohol was added to the slurry to form a slip of viscosity 380 cP. The slip was poured in a two piece plaster of paris mould of about 16 mm internal diameter, the upper level of the slurry was maintained at a constant level by gradual addition of the slip time to time. The slip was allowed to remain within the mould for 2.5 minutes to maintain about 2 mm thickness of the cast after which the excess slurry was drained off. The cast body was allowed to remain within the mould for about 2 hour after which the two halves of the mould were separated out and the green cast was allowed to dry under humid condition for 24 hours. The green cast tubes slowly dried in air oven at 120-130° C. for 24 hours. The green tubes were heated at the rate of 100° C. per hour maintained at 800° C. for 1 hour, then at 1500° C. for 4 hours and cooled to room temperature at the rate of 100° C. per hour. The fired bulk density of the tubes was 2.9 gm/cc. The apparent porosity of fired samples was found to be 20% and fired MOR of about 250 MPa. The clean water permeability of the tubular samples was of the order of 150 LMH·bar.

EXAMPLE 11

48 Kg of alumina powder (99.5% purity) of average particle size 37 μm was mixed with 72 Kg of processed and purified china clay containing 1.2 wt % iron oxide, soda. potash and calcium oxide as impurities. The powder mix was then charged in a alumina lined ball mill with charge: ball ratio of 3:1 and dry ground for 6 hours. 180 liters of deionised water was added to it and the slurry was wet ground for 17 hours. The slurry was unloaded in a flat container. 1800 cc of 5% w/v Darvan-7 and 600 cc of 2% w/v polyvinyl alcohol were added to the slurry to form a castable slip of viscosity 360 cP. The slip was poured in two piece plaster of paris mould of about 36 mm internal diameter and 1200 mm in length, the upper level of the slurry in the mould was maintained at a constant level by gradual addition of the slip from time to time. The slip was allowed to remain within the mould for 3 minutes to maintain about 3 mm thickness of the cast after which the excess slurry was drained off The cast body was allowed to remain within the mould for about 1.5 hour after which the two halves of the mould were separated and the green cast was allowed to dry under humid condition for 20 hours. The green cast tubes slowly dried in air oven at 120-130° C. for 24 hours. The average bulk density of green tubes was maintained in the range of 1.6-1.7 gm/cc. The green tubes were fired in an oil fired furnace at 1400° C. with a total firing schedule of 14 hours and cooling schedule of 10 hours. The apparent porosity of fired samples were found to be 56%, bulk density 1.32-1.5 gm/cc and water absorption of 40%. The clean water permeability of the tubular samples was of the order of 16 LPH at a pressure of 2 Kg/cm$^2$ of cut piece of 200 mm length, 26.6 mm internal diameter and 32.8 mm outer diameter.

The Advantages of the Present Invention are

Cheaper raw materials

Easy fabrication process requiring minimum investment

Feasibility of scaling-up up to 1000-1200 mm long tube of different porosity

Lower cost of production

We claim:

1. An apparatus for the production of arsenic free water, i.e., water containing <10 ppb arsenic, from arsenic contaminated water said apparatus comprising a mixing tank (1) containing a suspension of arsenic adsorbing media, (2), the said tank having an inlet (9) for the arsenic contaminated ground water to be treated, and an outlet (10) for discharge, the said outlet (10) being connected through a pump (3) to a feed back spray (11) to the mixing tank (1) and one or more pressure filtration modules (4), each of the said modules (4) housing one or more ceramic pressure filtration tubes (5) encased in such a manner so as to allow discharge of the filtered water through an outlet (7), the said pressure filtration module being also provided with a feed back connection (8) to the said mixing tank (1).

2. An apparatus as claimed in claim 1 wherein the outlet (10) is a valve between the mixing tank and the pump.

3. An apparatus as claimed in claim 1 wherein the porous ceramic pressure filtration tubes is of pore size in the range of 1 to 10 μm having a precoating (6) of thickness at least 10 μm of the arsenic adsorbing media (2).

4. An apparatus as claimed in claim 1 wherein a porous candle filter is provided for entrapping saturated arsenic enriched sludge.

* * * * *